United States Patent [19]

Belleson et al.

[11] Patent Number: 4,751,090

[45] Date of Patent: Jun. 14, 1988

[54] COMPOSITION FOR USE IN PREPARING GLAZED MICROWAVE POPCORN PRODUCT

[75] Inventors: James W. Belleson, Minnetonka, Minn.; Robert F. Schiffman, New York, N.Y.

[73] Assignee: E. A. Sween Company, Eden Prairie, Minn.

[21] Appl. No.: 853,636

[22] Filed: Apr. 18, 1986

[51] Int. Cl.⁴ .................................................. A23L 1/36
[52] U.S. Cl. ..................................... 426/93; 426/309; 426/242
[58] Field of Search ................. 426/93, 445, 450, 460, 426/808, 272, 288, 302, 309, 507, 446, 447, 234, 242

[56] References Cited

U.S. PATENT DOCUMENTS

| | | | |
|---|---|---|---|
| 3,689,291 | 9/1972 | Draper | 426/113 |
| 3,695,894 | 10/1972 | Hum | 426/241 |
| 3,704,133 | 11/1972 | Kracaver | 426/93 |
| 3,830,941 | 8/1974 | Luft et al. | 426/309 |
| 3,843,814 | 10/1974 | Greenwald-Kirstein | 426/93 |
| 3,851,574 | 12/1974 | Katz et al. | 426/107 |
| 3,961,091 | 6/1976 | Caccavale et al. | 426/93 |
| 3,973,045 | 8/1976 | Brandberg et al. | 426/110 |
| 4,038,425 | 7/1977 | Brandberg et al. | 426/107 |
| 4,096,281 | 6/1978 | Young et al. | 426/309 |
| 4,219,573 | 8/1980 | Borek | 426/111 |
| 4,409,250 | 10/1983 | Van Hulle et al. | 426/242 |

OTHER PUBLICATIONS

Spaulding 1986, New Popcorn Snack Products Epitomize the Value-Added Concept, Processed Prepared Foods Apr. issue, pp. 102-104.

*Primary Examiner*—Raymond N. Jones
*Assistant Examiner*—Carolyn Paden
*Attorney, Agent, or Firm*—Dorsey & Whitney

[57] ABSTRACT

A composition for use in, preparing, a microwavable popcorn product with a sugar glaze. The composition includes a glazing blend combined with unpopped popcorn. The glazing blend includes an oil component, a sugar component, a water component and a lecithin component, with the water and lecithin being in amounts effective to form a glaze and to control heating of the blend to permit substantially complete popping of the corn without burning the blend.

16 Claims, No Drawings

COMPOSITION FOR USE IN PREPARING GLAZED MICROWAVE POPCORN PRODUCT

The present invention relates generally to a composition for use in preparing, and a method of preparing, a coated or glazed microwave popcorn product, and more particularly to a composition for use in preparing, and a method of preparing, a microwave popcorn product with a sugar or sweetener based coating or glazing.

BACKGROUND OF THE INVENTION

The proliferation of microwave ovens has stimulated the development of many food products to be used in these ovens. A very popular, fast-growing category of such products is microwavable popcorn. There are currently numerous microwavable popcorn products on the market, many of which contain a flavored coating and are specially packaged to be heated in the microwave. The coating blends of these popcorn products consist generally of oils blended with a flavoring and/or spices.

To date, however, there has been no acceptable commercial production of a microwave popcorn product containing a sugar based glaze or coating. While popcorn products containing a sugar based glaze (commonly referred to as carmel corn and sold under current trademarks "Fiddle Faddle", "Crunch and Munch" and "Screaming Yellow Zonkers") are presently commercially available, they are not microwavable products. Instead, they are popcorn products prepared by topically applying a sugar based glaze or syrup to popped popcorn. This process involves popping the corn and subsequently pouring the separately prepared glaze or syrup over the popcorn while mixing or tumbling the corn. Carmel corn prepared in this way is then packaged and sold to the consumer in its finished state.

A flavored popcorn product is also shown in U.S. Pat. No. 3,704,133; however, this is not a microwave product, but instead contemplates popping the corn in a pan using conventional heating methods.

The principal reason for the absence of an acceptable microwavable popcorn product containing a sugar based glaze or coating, despite the existence of microwavable popcorn products containing various other flavored coatings, is related to the technical problem of popping popcorn in the microwave while simultaneously heating a sugar based glazing mixture. This problem arises because of the fact that the temperatures at which sugars tend to darken or begin to carmelize are extremely close to the temperatures at which popcorn pops. Carmelization is a complex high temperature reaction in which simple sugars are caused to polymerize and darken. When one attempts to make a sugar glazed popcorn product by conventional formulation means the results are invariably that the glaze becomes carmelized by the time the popcorn has popped. This leads to a product which is severely darkened and has a burnt flavor and odor. Such a product is not acceptable to the consumer.

Accordingly, there is a need in the art for a microwavable popcorn product, and method of preparing the same, in which the popcorn is coated with a sugar based glaze.

SUMMARY OF THE INVENTION

In contrast to the prior art, the present invention relates to a composition for use in preparing a microwavable popcorn product which is coated with a sugar based glaze. The invention also relates to a method for preparing such a product. Although sucrose is disclosed herein as the preferred sugar, it is contemplated that others could be used as well. For purposes of disclosing and defining the scope of the present invention, it is intended that the term sugar be construed broadly to mean any of the mono-, di-, and trisaccharides which possess the properties of a crystalline solid, are soluble in water and possess a sweet taste.

In accordance with the present invention, the microwavable popcorn product is prepared by utilizing a unique glazing blend which, when combined with unpopped popcorn and heated in a microwave oven, yields a sugar based, glazed popcorn similar to carmel corn and various other currently available commercial products produced by topical applications. The popcorn and glazing blend of the present invention is packaged so that it can be placed directly into a microwave oven, heated for a specified amount of time and, at the end of this heating period, produce a glazed popcorn product which is uniformly coated with a light-colored, sweet flavored coating. Such coating or glaze is not excessively sticky to the touch, but instead has a pleasant, carmel like glaze.

In general, the unprepared product includes the combination of unpopped popcorn and a glazing composition or blend which functions both to provide a medium for popping the popcorn in the microwave oven as well as forming the final sugar based glaze or coating on the popped popcorn. The preferred glazing composition contemplates an oil-in-water emulsion comprising a two-part blend of an oil phase and a sugar phase. The oil phase comprises an oil base and a blend of emulsifying agents preferably including a common emulsifier and specially treated lecithin, while the sugar or sweetener phase comprises a blend of water, sugar and various desired flavorings or spices such as salt, cinnamon, butter flavor, etc. Preferably the sugar phase includes a blend of sucrose and corn syrup although other sugars may be utilized as well. In preparing the product, the oil phase and sugar phase are blended together into an oil-in-water emulsion and then mixed with the unpopped popcorn. Such product is then packaged into appropriate microwavable containers for sale to the consumer.

When such product is heated in a microwave oven, it is anticipated that because of the different dielectric properties of the popcorn and the above-mentioned blend, these two components will heat at different rates. Normally, one would expect the glazing blend to rise in temperature faster than the popcorn because of its relatively low specific heat (due to its high oil and high sugar solids content) which, when combined with the high microwave absorption properties of such blend, cause fast heating. Popcorn, on the other hand, is relatively transparent to the microwave field because of its low moisture content and thus would not be expected to heat as well in a microwave field.

The inventors believe that as the product is heated in a microwave oven, both the popcorn and the glazing blend begin to heat rapidly, due principally to the energy transfer into the glazing blend and the transfer of heat from such blend to the popcorn. However, as the glazing blend reaches 212° F., water evaporation begins from the coating blend. This water evaporation slows down the temperature rise of the blend for a considerable period. During this time, the popcorn continues heating until it reaches its popping temperature which is in the general vicinity of 350° F.

While the popcorn is popping, the glazing blend bubbles vigorously because of the evaporation of the water. This bubbling is further enhanced by the surface tension of the blend which is affected and controlled by the interaction between the emulsifiers in the blend and the sugars. As a result of this bubbling, some of the glazing blend is splashed up onto the sides of the package and is allowed to drip down onto the popcorn, while some of it is dragged up onto the popcorn as it leaves the coating mass. Much of it, however, bubbles up through the popcorn mass as the popcorn is popping.

When substantially all of the free water has evaporated from the blend, the temperature of the glazing blend begins to rise rapidly to a temperature in excess of 300° F. It is important for the blend to reach these high temperatures in order to allow it to set up into a non-tacky glaze upon the popcorn when cooled. If the temperature of the sugar based glaze is allowed to climb too high, however, this glaze will carmelize and darken significantly in a very short period of time. It is at this time, after the coating has reached a high enough temperature to set up into a non-tacky glaze, but before carmelizing, when the microwave energy must be terminated.

In order to achieve the benefits of the present invention, the oil-in-water emulsion comprising the glazing blend or composition should contain film forming properties which result in a non-sticky glazed popcorn. Further, the formulation of the composition or blend should permit the popcorn to be substantially fully popped, while maintaining the blend at a lower temperature so as to preclude carmelization.

It is contemplated that the product of the present invention can be packaged in a number of different packages currently available; however, it is preferable for the package to be an expandable package which is constructed of a transparent material such as Mylar so that the user can view the product as it is popping. This enables the user to visually note the degree of popping so that when it has reached the desired level, the microwave energy can be terminated.

Accordingly, it is an object of the present invention to provide a composition or blend comprising an oil-in-water emulsion for use in preparing a microwavable popcorn product with a sugar based glaze or coating.

A further object of the present invention is to provide a method of preparing a microwavable popcorn product with a sugar based glaze or coating.

Still another object of the present invention is to provide a sugar glazed microwavable popcorn product in which the product can be prepared without burning or carmelizing the sugar.

Another object of the present invention is to provide a composition or blend comprising an oil-in-water emulsion for preparing a microwavable popcorn product with a non-sticky, sugar glaze.

These and other objects of the present invention will become apparent with reference to the description of the preferred composition and method and the appended claims.

DESCRIPTION OF THE PREFERRED COMPOSITION AND METHOD

The product with which the composition and the method of the present invention are particularly applicable is a microwavable popcorn product. In preparing the product, unpopped popcorn is combined with a glazing composition or blend comprising an oil-in-water emulsion and then packaged for preparation by the user in a microwave oven. While there are a number of different packages which would be acceptable and which are known in the art, the preferred packaging includes a heat sealed bag or pouch of the type generally illustrated in U.S. Pat. No. 4,279,933. This bag or pouch is placed into a supporting box or other container which supports the bag or pouch while the popcorn is popping. Preferably, the pouch should be constructed of a transparent material such as Mylar to allow visual observation of the popping of the corn. This enables the user to know when to shut off the microwave oven. This is usually necessary because of the wide variety of microwave ovens on the market having different microwave output power.

The dimensions of the expandable bag or pouch are related to the anticipated volume of the corn in its popped state. The expanded volume of the pouch or other expandable container should, of course, be greater than the actual popped volume of the corn. Preferably the volume of the expandable container should be at least about 33% greater than the anticipated volume of the popped corn so as to reduce the packing density of the popcorn, thereby reducing the likelihood of burning.

Although not necessary, it is preferable for the expandable pouch or container to have a round shape so that when the popcorn pops it expands into a large volume without being constricted as it would be in various other shapes. It is also preferable that the pouch be heat sealed so that at least portions of such heat seal remain sealed up to some critical temperature during the heating cycle. When such temperature is reached, the seam opens slightly along the sealed line to relieve steam pressure built up within the pouch.

The product of the present invention is comprised of two major components: the glaze system or glazing blend and the unpopped popcorn. Such product, in its prepared form, comprises the following preferred formula, with the components expressed in grams and as a percentage (by weight) of the total combined product:

| Component | Weight (grams) | % By Weight |
|---|---|---|
| Unpopped Corn | 45.0 | 32.19% |
| Sugar | 36.9 | 26.39% |
| Vegetable oil | 25.7 | 18.38% |
| Water | 18.3 | 13.09% |
| Corn Syrup (solids) | 11.6 | 8.30% |
| Salt | 1.1 | 0.79% |
| Emulsifier | 0.6 | 0.43% |
| Lecithin | 0.6 | 0.43% |
|  | 139.8 | 100.00% |

While the relative amounts of the individual components can change within certain limits, the above formulation is preferred and has been shown to produce a satisfactory product. The ratio of glazing blend (those components other than the unpopped corn) to corn in the above formulation is about 2.1:1. It is contemplated, however, that other ratios will also produce satisfactory products. The acceptable range of glazing blend to corn ratio is about 1.8:1 to 3:1, with the preferred range of such ratio being about 2:1 to 2.5:1. The above ratios provide relatively complete coating with little or no excess glazing that can burn.

It is contemplated that all popcorn will work in the present invention, but that some types and sizes of popcorn will give better results. The preferred popcorn is "mushroom" popcorn having a kernel size of about 55-60 kernels per 10 grams.

The composition or glazing blend which is combined with the unpopped popcorn is an oil-in-water emulsion comprising a two-part blend of an oil phase and a sugar or sweetener phase. In the preferred formulation, the oil and sugar phases are prepared with components in the following amounts relative to their particular phases:

| Component | Weight (grams) | % By Weight |
|---|---|---|
| Oil Phase | | |
| Oil | 42 | 95.45% |
| Emulsifier | 1 | 2.27% |
| Lecithin | 1 | 2.27% |
| | 44 | 100.00% |
| Sugar Phase | | |
| Liquid Sucrose | 38 | 50.67% |
| Corn Syrup | 16 | 21.33% |
| Sucrose | 16 | 21.33% |
| 25% Salt Solution in Water | 5 | 6.67% |
| | 75 | 100.00% |

While it is contemplated that the glazing blend or composition could be prepared by mixing or combining all of the above components in a single step, the preferred procedure is to prepare the oil phase and sugar phase separately and then blend the oil and sugar phases to produce the oil-in-water emulsion, after which the blend is combined with the unpoped popcorn. The relative amounts of the components in the preferred formulation of the final blend are set forth in the following tables. Table 1 shows the components free of water, Table 2 shows the components when liquid sucrose, liquid corn syrup and a 25% salt solution in water are used and Table 3 shows the components when dry sugar, dry salt, water and liquid corn syrup are used.

TABLE 1

| Component | Weight (grams) | % By Weight |
|---|---|---|
| Dry Sugar | 36.9 | 38.924% |
| Oil | 25.7 | 27.110% |
| Water | 18.3 | 19.304% |
| Corn Syrup (solids) | 11.6 | 12.236% |
| Dry Salt | 1.1 | 1.160% |
| Emulsifier | 0.6 | 0.633% |
| Lecithin | 0.6 | 0.633% |
| | 94.8 | 100.00% |

TABLE 2

| Component | Weight (grams) | % By Weight |
|---|---|---|
| Liquid Sucrose | 34.4 | 36.287% |
| Oil | 25.7 | 27.110% |
| Liquid Corn Syrup | 14.5 | 15.295% |
| Dry Sugar | 14.5 | 15.295% |
| Salt (25% Solution) | 4.5 | 4.749% |
| Emulsifier | 0.6 | 0.633% |
| Lecithin | 0.6 | 0.633% |
| | 94.8 | 100.00% |

TABLE 3

| Component | Weight (grams) | % By Weight |
|---|---|---|
| Dry Sugar | 36.9 | 38.924% |
| Oil | 25.7 | 27.110% |
| Water | 15.4 | 16.245% |

TABLE 3-continued

| Component | Weight (grams) | % By Weight |
|---|---|---|
| Liquid Corn Syrup | 14.5 | 15.295% |
| Dry Salt | 1.1 | 1.160% |
| Emulsifier | 0.6 | 0.633% |
| Lecithin | 0.6 | 0.633% |
| | 94.8 | 100.00% |

The oil phase is comprised of three principal components, an oil, an emulsifier and lecithin. The oil component can be any one of many commercially available oils such as soybean oil, coconut seed oil, cottonseed oil, etc. Preferably, the smoke point (the temperature at which the oil begins to smoke) of the selected oil should be as high as possible and desirably higher than the temperature which will be achieved during the popping of the corn in the present product. The selected oil should also preferably have a melting point above room temperature so that it will remain in a solid or semi-solid form at room temperature. Although it is contemplated that the benefits of the present invention can still be achieved by utilizing an oil with a melting point below room temperature, such an oil is undesirable in that there is the possibility of spillage, etc. if packages should inadvertently be punctured prior to use. Preferably, the melting point of the oil should be between 95° and 140° F., with a melting point around 110° F. preferred. The oil component in the glazing blend should preferably be between about 19.1% and 46.3% by weight of said glazing blend.

The emulsifier component of the oil phase is comprised of an emulsifying agent whose principal function is to emulsify the oil and water components of the final glazing blend so as to form the desired oil-in-water emulsion and to maintain homogeneity in such blend. This in turn tends to slow down the heating of the blend via microwave energy to permit the popcorn to increase in temperature and pop. Most emulsifiers or emulsifying agents, or combinations of emulsifiers or emulsifying agents, which are capable of forming the oil-in-water emulsion of the present glazing composition will function acceptably in the present invention. In the preferred formulation of the present invention, the emulsifying function is performed in part by lecithin and in part by an additional emulsifying agent. The preferred additional emulsifier for the oil phase of the glazing blend of the present invention is an emulsifier identified by the trademark PANALITE manufactured by ITT Paniplus of Olathe, Kan. This particular product is a blend of mono- and diglycerides with polysorbate 60 and has an HLB (hydrophilic lipophilic balance) number of 8.1. Success has also been achieved with a blend of 80% mono- and diglycerides with 20% polysorbate 80. It is believed that the HLB of the emulsifier should preferably be between about 7 and 18.

As indicated, the principal function of the emulsifier is to form the desired oil-in-water emulsion and to maintain homogeneity in the total composition when the oil phase and the water based sugar phase are combined. The emulsifier also functions to control the viscosity of the blend as it is being heated. If the emulsifier is eliminated from the composition, the water will boil off too quickly. This results in the temperature of the coating rising prematurely. As a result, the end product is either burned or the microwave energy must be stopped before the popping of the corn is complete. As will be discussed below, it is possible for the lecithin component (a natural emulsifier), under the proper circumstances and with the proper formulations, to perform a level of emulsification sufficient to obviate the need for a further emulsifying agent.

The amount of emulsifying agent which is preferred should be that amount which will result in the temperature of the glazing blend lagging behind the temperature rise in the popcorn so that just as the popping of the corn is complete, all of the water from the blend has evaporated and the temperature of such blend has risen to a temperature in which the coating has set up to form the desirable glaze, but prior to reaching a temperature at which the coating will burn or carmelize. It has been determined that the additional emulsifier in the preferred formulation should preferably be present in an amount between approximately 0% and 0.84% by weight of the total glazing blend. When the amount of additional emulsifier is 0%, the emulsifying function is provided solely by the lecithin. If emulsification action is too high, the water in the blend takes longer to boil off; therefore, the popcorn pops too quickly and the glazing blend forms a less acceptable glaze. If the amount of emulsification action is too low, the water in the blend tends to boil off more quickly, thereby resulting in premature burning or insufficiently popped popcorn.

As indicated above, the lecithin component in the oil phase serves some emulsifying function in the total glazing blend since it is an emulsifier of natural origin, but serves principally to form a desirable, non-sticky glaze on the popped corn. Elimination of the lecithin component results in a generally unacceptable, sticky coating. With the lecithin, however, the coating is smooth and glassy in appearance. It is also believed that the lecithin helps to maintain a desirable color in the end product by preventing or slowing down the darkening of the product as it is heated. There are several forms of lecithin that can be utilized in the formulation of the present composition. Preferably, however, best performance is obtained by using a high temperature stability lecithin such as that which is manufactured by Central Soya Co., Inc. of Fort Wayne, Ind. and sold under the trademark CENTROPHASE HR.

The actual amount of lecithin in the blend will depend, to some extent, on the level of various other components in the system including the amount of the sugar phase, the ratio between the oil and sugar phases, the amount of additional emulsifier, etc. However, it is generally suggested that lecithin in the total glazing blend should be in an amount of approximately 0.23% to 0.84% by weight with the preferred level being approximately 0.63% by weight of the total glazing blend.

The sugar phase is comprised generally of a sugar component, a water component and a salt or other flavoring component. It is contemplated, however, that the sugar component can comprise a number of different sugar forms. In the preferred formulation of the present invention, the sugar is provided in the form of liquid sucrose, powdered or granular sucrose and corn syrup. In the preferred final glazing blend, it is contemplated that the sucrose component will comprise between about 31.9% and 43.5% by weight of such blend and that the corn syrup solids will comprise between about 10.5% and 13.7% by weight of such blend.

In the preferred formulation, a portion of the sucrose is provided as liquid sucrose which is 65% solids, with the remainder being provided as simple granular sucrose. The reason for this particular combination is to "stuff" or supersaturate the liquid containing sucrose so that the liquid containing the sucrose becomes approximately 75% solids. The liquid sucrose used in the preferred formulation is manufactured by American Crystal Sugar Co. of Moorhead, Minn. The granular portion of the sucrose can be any standard sucrose product; however, a fine powdered product is preferable so as to increase the rate of solubility. It is also preferable if the sucrose does not contain a flow agent which would otherwise cloud the glaze.

The corn syrup is approximately 80% solids and is utilized in the composition of the present formulation for several reasons. First, it does not burn or carmelize as fast as sucrose; thus, it protects the sucrose, to some extent, from burning. Secondly, it assists in the glazing process. Thirdly, addition of the corn syrup as a sugar component to the supersaturated sucrose helps prevent the sucrose from crystallizing out at room temperature. The oil phase also assists in this function. The corn syrup in the preferred formulation of the present invention is identified as 36DE and is manufactured by Cargill, Inc. of Minneapolis, Minn.

The principal function of the sugar and syrup component is two-fold. First, it provides the glaze and sweet taste of the product and secondly, it helps in the preservation process by increasing osmotic pressure in the corn and reducing water activity to retard microbial growth, thereby extending the shelf life of the corn.

The water component in the final glazing blend should be between 2.5% and 21.6% by weight with a preferred range of approximately 17% to 21%. The actual amount of water in the total blend, however, should preferably be great enough to slow down the heating of the coating blend during exposure to microwave energy to allow the corn sufficient time to pop, but small enough to prevent the heating of the blend from lagging too far behind the heating of the popcorn. In the preferred composition, the water is added as part of the liquid sucrose, as part of the corn syrup and as part of the salt solution.

The salt or other seasonings or flavorings in the above formulation are added in a water solution. In the preferred formula a 25% salt solution in water is added to the total blend. The actual amount of salt or other seasonings is a matter of personal preference although the preferred formulation contemplates about 1.16% salt by weight of the glazing blend.

It is contemplated that all of the above ingredients can be combined in a single mixing step to provide the blend of the present invention providing such mixing is effective to homogenize the oil and water phases. The preferable procedure for preparing the coating blend, however, is to prepare the oil phase and the sugar phase separately and then combine the two with sufficient mixing to form the desired oil-in-water emulsion, but not so vigorous as to incorporate air. In this procedure, the oil phase is prepared by combining the oil phase ingredients, namely, the oil, the emulsifier and the lecithin, and then heating to a temperature of approximately 150 to 155° F. Preferably, the temperature should be above the melting temperature of the oil, emulsifier and lecithin, but not so high as to thermally stress any of the components. These ingredients are then stirred until the emulsifier and lecithin are dissolved in the oil, after which the mixture is allowed to cool to room temperature.

The sugar phase is prepared by adding the granular sucrose, the corn syrup and the salt or other flavored solution to the liquid sugar and then heated to approximately 150 to 155° F. Preferably, the actual temperature should be sufficiently high to dissolve all of the components and achieve a 75% solids supersaturated solution, but not so high as to cause thermal degradation of the sugar. This combination is then mixed thoroughly until all of the components are dissolved, after which it is allowed to cool to room temperature.

The prepared oil phase and the prepared sugar phase are then combined with sufficient mixing to form the desired oil-in-water emulsion. Although various ratios of oil phase to sugar phase can be utilized, it is contemplated that the oil phase should preferably be between 20% and 50% by weight of the final glazing blend and the sugar phase should be between 50% and 80% by weight of the final glazing blend.

Following combination of the oil and sugar phases, an appropriate amount of the finished blend is then placed in a suitable expandable bag or pouch along with the desired amount of popping corn. The bag is then heat sealed and placed in a container in the manner described above. The product is then ready for use.

Although the description of the present invention has been quite specific, it is contemplated that various changes could be made without deviating from the scope of the present invention. Accordingly, it is contemplated that the scope of the present invention be dictated by the appended claims rather than by the description of the preferred composition and method.

We claim:

1. A microwavable composition usable in preparing a microwavable popcorn product with a sugar based glaze comprising:
   unpopped popcorn; and
   a glazing blend comprising an oil-in-water emulsion in which said emulsion includes an oil component, a sugar component, a water component, and a lecithin component, said lecithin component functioning to promote the formation of said glaze and, at least in part, to maintain said oil-in-water emulsion, said water component being present in said glazing blend in an amount of about 17% to 21% by weight of said glazing blend, and said amounts of lecithin and water components being effective to control the heating of said glazing blend to permit substantially complete popping of said unpopped popcorn without burning said glazing blend.

2. The composition of claim 1 including an emulsifier component which, along with said lecithin component, functions to maintain said oil-in-water emulsion and control the heating of said glazing blend, said emulsifier component being present in said glazing blend in an amount no greater than about 0.84% by weight of the glazing blend.

3. The composition of claim 2 wherein said emulsifier component has an hydrophilic lipophilic balance (HLB) greater than 5.

4. The composition of claim 3 wherein said emulsifier component has an HLB of between about 7 and 18.

5. The composition of claim 2 wherein said emulsifier component is present in said coating blend in an amount no greater than about 0.84% by weight, said lecithin component is present in an amount between about 0.23% and 0.84% by weight and said water component is present in an amount between about 2.5% and 21.6% by weight.

6. The composition of claim 1 wherein said lecithin component is present in said glazing blend in an amount between about 0.23% and 0.84% by weight of said glazing blend.

7. The composition of claim 1 wherein the ratio of glazing blend to unpopped popcorn is in the range of about 1.8:1 to 3:1.

8. The composition of claim 7 wherein the ratio of glazing blend to unpopped popcorn is approximately 2.1:1.

9. The composition of claim 1 wherein said oil component is present in said glazing blend in an amount between about 19.1% and 46.3% by weight of said glazing blend.

10. The composition of claim 1 wherein said sugar component is present in said glazing blend in an amount between about 42.4% and 57.2% by weight of said glazing blend.

11. The composition of claim 10 wherein said sugar component is sucrose.

12. The composition of claim 1 wherein said sugar component includes sucrose and corn syrup.

13. The composition of claim 1 including a corn syrup component having corn syrup solids in an amount between about 10.5% and 13.7% by weight of said glazing blend.

14. A microwavable popcorn glazing blend usable with unpopped popcorn in preparing a microwavable popcorn product with a sugar based glaze comprising a glazing blend which includes an oil-in-water emulsion in which said emulsion includes an oil component, a sugar component, a water component, and a lecithin component, said lecithin component functioning to promote the formation of said glaze and, at least in part, to maintain said oil-in-water emulsion, said water component being present in said glazing blend in an amount of about 17% to 21% by weight of said glazing blend, and said amounts of lecithin and water components being effective to control the heating of said glazing blend to permit substantially complete popping of said unpopped popcorn without burning said glazing blend.

15. The glazing blend of claim 14 including an emulsifier component which, along with said lecithin component, functions to maintain said oil-in-water emulsion, said emulsifier component being present in said glazing blend in an amount no greater than about 0.84% by weight of the glazing blend.

16. The glazing blend of claim 15 wherein said emulsifier component is present in said glazing blend in an amount no greater than about 0.84% by weight, said lecithin component is present in an amount between about 0.23% and 0.84% by weight and said water component is present in an amount between about 2.5% and 21.6% by weight.

* * * * *